US009618000B2

(12) United States Patent
Kim et al.

(10) Patent No.: US 9,618,000 B2
(45) Date of Patent: Apr. 11, 2017

(54) CANNED-MOTOR PUMP FOR VEHICLE

(71) Applicants: Hyundai Motor Company, Seoul (KR); Kia Motors Corporation, Seoul (KR)

(72) Inventors: Hark Koo Kim, Seoul (KR); Seung Yong Lee, Gyeonggi-do (KR); Chi Myung Kim, Gyeonggi-do (KR); Yeon Seok Jung, Gyeongsangnam-do (KR); Kyung Yub Kim, Gyeongsangnam-do (KR); Chang Gook Lee, Gyeongsangnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 202 days.

(21) Appl. No.: 14/314,871

(22) Filed: Jun. 25, 2014

(65) Prior Publication Data

US 2015/0023816 A1 Jan. 22, 2015

(30) Foreign Application Priority Data

Jul. 18, 2013 (KR) ........................ 10-2013-0084514

(51) Int. Cl.

| | |
|---|---|
| ***F04D 29/04*** | (2006.01) |
| ***H02K 5/128*** | (2006.01) |
| ***H02K 5/167*** | (2006.01) |
| ***F04D 13/06*** | (2006.01) |
| ***F04D 29/041*** | (2006.01) |
| ***F04D 29/047*** | (2006.01) |

(52) U.S. Cl.
CPC ..... *F04D 13/0633* (2013.01); *F04D 29/0413* (2013.01); *F04D 29/0473* (2013.01); *H02K 5/128* (2013.01); *H02K 5/1675* (2013.01)

(58) Field of Classification Search
CPC ........ H02K 5/16; H02K 5/167; H02K 5/1672; H02K 5/1285; H02K 5/132; H02K 5/1675; F04D 13/0633; F04D 29/0413; F04D 29/0473
USPC .......................... 310/86, 87, 88, 90; 417/366
See application file for complete search history.

(56) References Cited

U.S. PATENT DOCUMENTS

| | | | | |
|---|---|---|---|---|
| 3,254,248 | A | 5/1966 | Hagen | |
| 3,548,229 | A | 12/1970 | Evans | |
| 4,395,204 | A | 7/1983 | Turner | |
| 2006/0017339 | A1* | 1/2006 | Chordia ................ | H02K 5/128 310/86 |

(Continued)

FOREIGN PATENT DOCUMENTS

| | | | |
|---|---|---|---|
| JP | 09-280190 | A | 10/1997 |
| JP | 2003-222095 | A | 8/2003 |

(Continued)

*Primary Examiner* — Thomas Truong

(74) *Attorney, Agent, or Firm* — Mintz Levin Cohn Ferris Glovsky and Popeo, P.C.; Peter F. Corless

(57) ABSTRACT

A canned motor pump is provided that includes a rotor of a motor and a shaft shaped as a bar. The shaft penetrates through and is coupled with the rotor. A bearing is shaped as a circular cylinder, and is coupled to an upper side of the rotor. Further, the shaft penetrates through the bearing. A housing surrounds the rotor and the bearing to expose an upper end of the bearing and to house the rotor and the bearing within the housing.

8 Claims, 3 Drawing Sheets

400
310
210
300
211
330
230
350
213
100
200
250
270

(56) References Cited

U.S. PATENT DOCUMENTS

| | | | | |
|---|---|---|---|---|
| 2006/0057003 | A1* | 3/2006 | Mitsuda | F04D 29/061 417/423.12 |
| 2008/0075586 | A1* | 3/2008 | Fukuki | F04D 1/063 415/177 |
| 2011/0033320 | A1* | 2/2011 | Heier | F04D 13/0606 417/410.1 |
| 2012/0180279 | A1 | 7/2012 | Tuery et al. | |

FOREIGN PATENT DOCUMENTS

| | | | |
|---|---|---|---|
| JP | 2005-315184 | A | 11/2005 |
| JP | 2010-236539 | A | 10/2010 |
| JP | 2014-039366 | A | 2/2014 |
| KP | 10-2002-0015303 | A | 2/2002 |
| KP | 10-1186212 | B1 | 10/2012 |
| KR | 20-1992-0018305 | U | 10/1992 |
| KR | 20-1993-0007587 | U | 4/1993 |
| KR | 10-1995-0003639 | A | 2/1995 |
| KR | 10-2000-0007175 | A | 2/2000 |
| KR | 10-2003-0066157 | A | 8/2003 |
| KR | 10-2004-0103588 | A | 12/2004 |
| KR | 10-2005-0105021 | A | 11/2005 |
| KR | 10-2006-0009719 | A | 2/2006 |
| KR | 10-2007-0064314 | A | 6/2007 |
| KR | 10-2008-0051209 | A | 6/2008 |
| KR | 10-2009-0002830 | A | 1/2009 |
| KR | 10-2010-0050986 | A | 5/2010 |
| KR | 10-2011-0055278 | A | 5/2011 |
| KR | 10-2012-0113102 | A | 10/2012 |
| WO | 01/35515 | A1 | 5/2001 |

* cited by examiner

CANNED-MOTOR PUMP FOR VEHICLE

CROSS REFERENCE TO RELATED APPLICATION

The present application claims priority of Korean Patent Application Number 10-2013-0084514 filed on Jul. 18, 2013, the entire contents of which application are incorporated herein for all purposes by this reference.

BACKGROUND

Field of the Invention

The present invention relates to a canned motor pump in which a can structure is interposed between a rotor and a stator.

Description of the Related Art

In general, a canned motor pump is a canned motor type electric pump, in which a can part is interposed between a rotor and a stator. While a description will be given to a water pump herein, it may be equally applied to an oil pump. In the canned motor pump, bearings are disposed between rotating components since the rotating components are connected to each other. The ability of the bearings to reduce friction and support the components is determined by how the bearings are coupled with a shaft.

According to a related art, a concave-convex structure is formed on the outer surface of a shaft, a rotor is fitted around the shaft, and bearings are disposed on both sides of the rotor. In particular, the inner wheel sides of the bearings are configured to adjoin to the side surfaces of convex structure. However, this technology has the drawbacks of the increased number of processes, the complex structure, and difficulty in reliably supporting the rotor. Therefore, there is required a canned motor pump which has a simplified structure to reduce the number of processes while further reducing friction and performing a support function.

The foregoing is intended merely to aid in the understanding of the background of the present invention, and is not intended to mean that the present invention falls within the purview of the related art that is already known to those skilled in the art.

SUMMARY

Accordingly, the present invention provides a canned motor pump having a simplified structure to reduce the number of processes while properly reduces friction and performs a support function.

In order to achieve the above object, according to one aspect of the present invention, a canned motor pump may include: a rotor of a motor; a shaft shaped as a bar, the shaft penetrating through and being coupled with the rotor; a bearing shaped as a circular cylinder, the bearing being coupled to an upper side of the rotor, wherein the shaft penetrates through the bearing; and a housing that surrounds the rotor and the bearing to expose an upper end of the bearing and configured to house the rotor and the bearing.

According to an exemplary embodiment of the present invention, the housing may be injection-molded to surround outer circumferences of the rotor and the bearing of an assembly in which the rotor, the shaft and the bearing may be coupled together. A pump body may be coupled to an upper side of the bearing, and a front bearing may penetrate through and be coupled with the shaft below the pump body to cause the bearing to be rotatable with respect to the front bearing. The thickness of an upper surface of the housing may be greater than the thickness of a side or a bottom surface of the housing. The bearing may be shaped as a circular cylinder and may include an upper flange, a lower flange and a neck. The diameter of a substantially middle portion of the neck may be less than the diameter of an upper end or a lower end of the neck.

In particular, the housing may be formed around the neck of the bearing to expose the upper flange above the housing. The bearing may include a protrusion that protrudes radially from a side surface of the bearing. The bearing may be made of an elastic material. The housing may be substantially closed by the bearing. A rear bearing may be coupled with a lower portion of the shaft.

According to the canned motor pump having the configuration as described above, the bearing may be supported to not be shaken by the rotation of the rotor and the shaft. In addition, the cover and the bearing may provide a water seal that prevents fluid from contacting the rotor. These features may increase the endurance of the components. Furthermore, since the cup bearing, which may be disposed extraneous to the bearing to support the bearing, may be precluded, it may be possible to simplify the structure and reduce the number of components. Furthermore, since the shaft, the housing and the rotor may be injection-molded, it may be possible to advantageously reduce the number of processes, reduce fabrication cost, and improve productivity.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
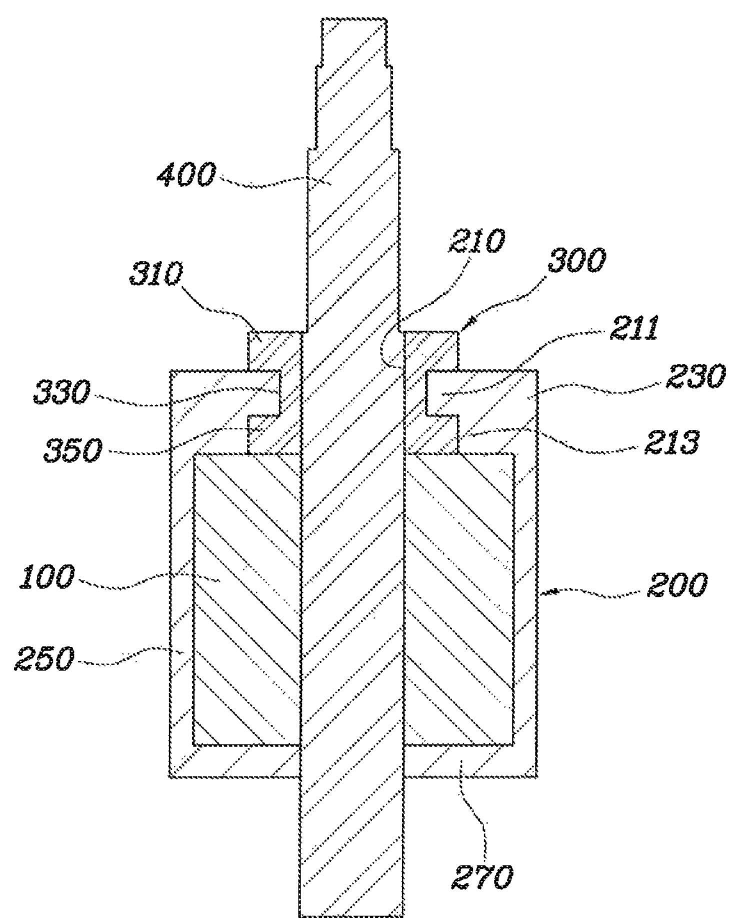
FIG. 1 is an exemplary cross-sectional view showing a rotor, a housing and a bearing of a canned motor pump according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of a canned motor pump according to the present invention will be described in detail with reference to the accompanying drawings.

In general, the canned motor pump may be a canned motor type electric pump, in which a can part C may be interposed between a rotor 100 and a stator (not shown). In addition, the canned motor pump may include a hydro unit (not shown) extended to the rotor 100 and the rotor 100 may be submerged into fluid to cool down (e.g., reduce the temperature of) frictional heat generated by the rotor 100 using the inflowing fluid. In the canned motor pump, some components rotate, and components of rotating parts may come into direct contact with each other, thereby creating friction. Therefore, a variety of bearings 300, 600 and 700 may be mounted to reduce friction to prevent damage to the components caused by friction while supporting the components.

The bearings may include the front bearing 600 disposed inside a pump body 500 to cause a shaft 400 to penetrate through and be coupled with the front bearing 600, a rear bearing 700 mounted on the rear portion of the shaft 400, and a thrust bearing 300 (hereinafter referred to as "bearing 300") disposed between the upper portion of the rotor 100 and the front bearing 600. The present invention relates to the canned motor pump which is characterized by the thrust bearing 300 which is referred to as the bearing 300 herein.

Figure 2:
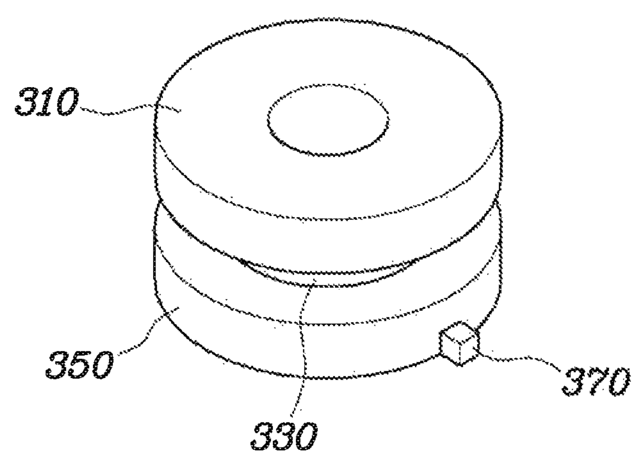
FIG. 2 is an exemplary detailed view of the bearing according to an exemplary embodiment of the present invention.
Figure 3:
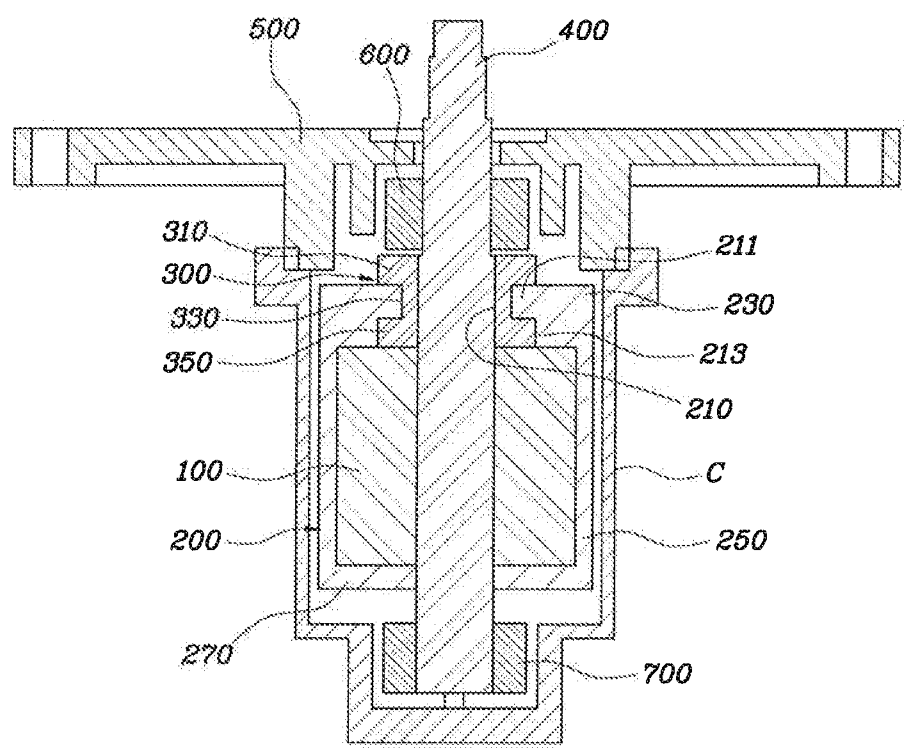
FIG. 3 is an exemplary cross-sectional view showing that the structure shown in FIG. 1 is coupled to a pump body and a can part according to an exemplary embodiment of the present invention.

FIG. 1 is an exemplary cross-sectional view showing the rotor 100, a housing 200 and the bearing 300 of the canned motor pump according to an exemplary embodiment of the present invention, FIG. 2 is an exemplary detailed view of the bearing 300, and FIG. 3 is an exemplary cross-sectional view showing that the structure shown in FIG. 1 is coupled to the pump body 500 and the can part C.

The canned motor pump according to an exemplary embodiment of the present invention may include the rotor 100 of a motor, the housing 200, the bearing 300 and the shaft 400. The shaft 400 may have the shape of a bar, and may be configured to penetrate through and be coupled with the rotor 100. The bearing 300 may be shaped as a circular cylinder, and may be coupled to an upper side of the rotor 100. The shaft 400 may be configured to penetrate through the bearing 300. The housing 200 may surround the rotor 100 and the bearing 300 to expose the upper end of the bearing 300 and may house the rotor 100 and the bearing 300 within the housing 200.

The housing 200 may be injection-molded to surround the outer circumferences of the rotor 100 and the bearing 300 of an assembly in which the rotor 100, the shaft 400 and the bearing 300 are coupled together. As shown in FIG. 1, the shall 400 may be configured to penetrate through and be coupled with the rotor 100, and then the shaft 400 may be configured to penetrate through and be coupled with the bearing 300 above the rotor 100. Afterwards, the housing 200 may be injection-molded around the rotor 100. The housing 200 may have the shape of a circular column made of plastic. Although the material and shape are selected according to this exemplary embodiment, they may be properly changed depending on the design and environment. Thus, the housing 200 may be coupled with the outer surface of the rotor 100 such that no gap (e.g., a minimal gap) is present between the rotor 100 and the housing 200 since a gap causes vibration and noise when the motor is rotating.

The housing 200 may have a closed shape that includes an upper wall 230, a side wall 250 and a bottom wall 270. The thickness of the upper wall 230 may be greater by a predetermined size than the thickness of either the side wall 250 or the bottom wall 270 of the housing 200 to firmly support the bearing 300 by the housing 200 when the bearing 300 applies axial force upward to the front bearing 600. In addition, since the upper wall 230 of the housing 200 is of substantial thickness, the upper wall 230 may be configured to increase sealing force to provide an improved seal, to prevent fluid that inflows from above the pump body 500 from contacting the rotor 100 having a laminated structure of zinc.

The aperture 210 formed in the upper wall 230 of the housing 200 may be the portion with which the bearing 300 may be coupled to cause the housing 200 to be sealed by the bearing 300. The aperture 210 may have a stepped portion, with which the diameter of the lower end 213 may be greater than the diameter of the upper end 211. In addition, the bearing 300 may be shaped as a circular cylinder made of an elastic material. The bearing 300 may include an upper flange 310, a lower flange 350 and a neck 330. The diameter of the middle portion of the neck 330 may be less than the diameter of the upper end or the diameter of the lower end of the neck 330

The bearing 300 having the configuration as described above may be fitted into and coupled with the housing 200 to provide an improved seal to the housing 200 thus preventing fluid from entering the housing 200. Accordingly, rust to the rotor due to the fluid may also be prevented. Although this exemplary embodiment was described as the upper flange 310 and the lower flange 350 extend radially beyond the neck 330, the details of the respective components may be changed depending on the design. The diameter of the upper end 211 of the aperture 210 of the housing 200 may be about the same as the diameter of the neck 330, and the diameter of the lower end 213 of the aperture 210 may be about the same as the diameter of the lower flange 350. In addition, the diameter of the upper flange 310 may be set greater than the diameter of the upper end 211 of the aperture 210.

With this configuration, the lower flange 350 of the bearing 300 may be fitted into and coupled with the lower end 213 of the aperture 210, the neck 330 of the bearing 300 may be positioned in the upper end 211 of the aperture 210, and the upper flange 310 of the bearing 300 that expands radially beyond the diameter of the aperture 210 may be disposed on the upper surface of the housing 200 to expose the upper flange 310. Accordingly, the housing 200 may be sealed by the bearing 300, thereby preventing fluid from contacting the rotor 100.

As described above, the rotor 100, the housing 200 and the bearing 300 may be provided by injection molding. For injection molding, the flanges 310 and 350 of the bearing 300 may have a protrusion 370 that protrudes radially from the outer side surface thereof. The protrusion 370 may facilitate molding, increase endurance, and prevent the pump body 500 from being pulled when the pump is rotating. In addition, when these parts are injection-molded, the number of processes and thus fabrication cost may be reduced.

Therefore, according to the present invention, the shaft 400 may be configured to penetrate through and be coupled with the pump body 500 and the front bearing 600 coupled with the lower portion of the pump body 500, the rear bearing 700 may be coupled with the lower portion of the shaft 400 to rotate the rotor 100 due to friction with the bearing 300 and the front bearing 600, and the bearing 300 may be configured to transfer upward axial force to the front bearing 600. According to the canned motor pump as described above, the bearing 300 may be supported to not be shaken by the rotation of the rotor 100 and the shaft 400. In addition, the housing 200 and the bearing 300 may provide a water seal that prevents fluid from contacting the rotor 100. These features may increase the endurance of the components. Furthermore, since the cup bearing disposed extraneous the bearing 300 to support the bearing 300 may be omitted, it may be possible to simplify the structure and reduce the number of components. Additionally, since the shaft 400, the housing 200 and the rotor 100 may be injection-molded, the number of processes and fabrication cost may be reduced and productivity may be improved.

Although exemplary embodiments of the present invention have been described for illustrative purposes, those skilled in the art will appreciate that various modifications, additions and substitutions am possible, without departing from the scope and spirit of the present invention as disclosed in the accompanying claims.

What is claimed is:

1. A canned motor pump comprising:

a rotor of a motor;

a shaft shaped as a bar and configured to penetrate through and be coupled with the rotor;

a bearing shaped as a circular cylinder and coupled to an upper side of the rotor, wherein the shaft is configured to penetrate through the bearing; and a housing that surrounds the rotor and the bearing to expose an upper end of the bearing and house the rotor and the bearing within the housing, wherein the bearing is shaped as a circular cylinder which includes an upper flange, a lower flange and a neck, wherein a diameter of a substantially middle portion of the neck is less than a diameter of an upper end or a lower end of the neck, wherein the bearing which is surrounded by the housing is a thrust bearing, and wherein the housing is formed around the neck of the bearing to expose the upper flange above the housing.

2. The canned motor pump according to claim 1, wherein the housing is injection-molded to surround outer circumferences of the rotor and the bearing of an assembly in which the rotor, the shaft and the bearing are coupled together.

3. The canned motor pump according to claim 1, wherein a pump body is coupled to an upper side of the bearing, and a front bearing is configured to penetrate through and be coupled with the shaft below the pump body to cause the bearing to be rotatable with respect to the front bearing.

4. The canned motor pump according to claim 1, wherein a thickness of an upper surface of the housing is greater than a thickness of a side or a bottom surface of the housing.

5. The canned motor pump according to claim 1, wherein the bearing includes a protrusion that protrudes radially from a side surface of the bearing.

6. The canned motor pump according to claim 1, wherein the bearing is made of an elastic material.

7. The canned motor pump according to claim 1, wherein the housing is closed by the bearing.

8. The canned motor pump according to claim 1, wherein a rear bearing is coupled with a lower portion of the shaft.

* * * * *